March 20, 1951     L. PERRAULT     2,545,792
PIPE COATING SHOE

Filed March 11, 1946                        2 Sheets-Sheet 1

INVENTOR.
LEWIS PERRAULT
BY
C. M. McKnight
Attorney

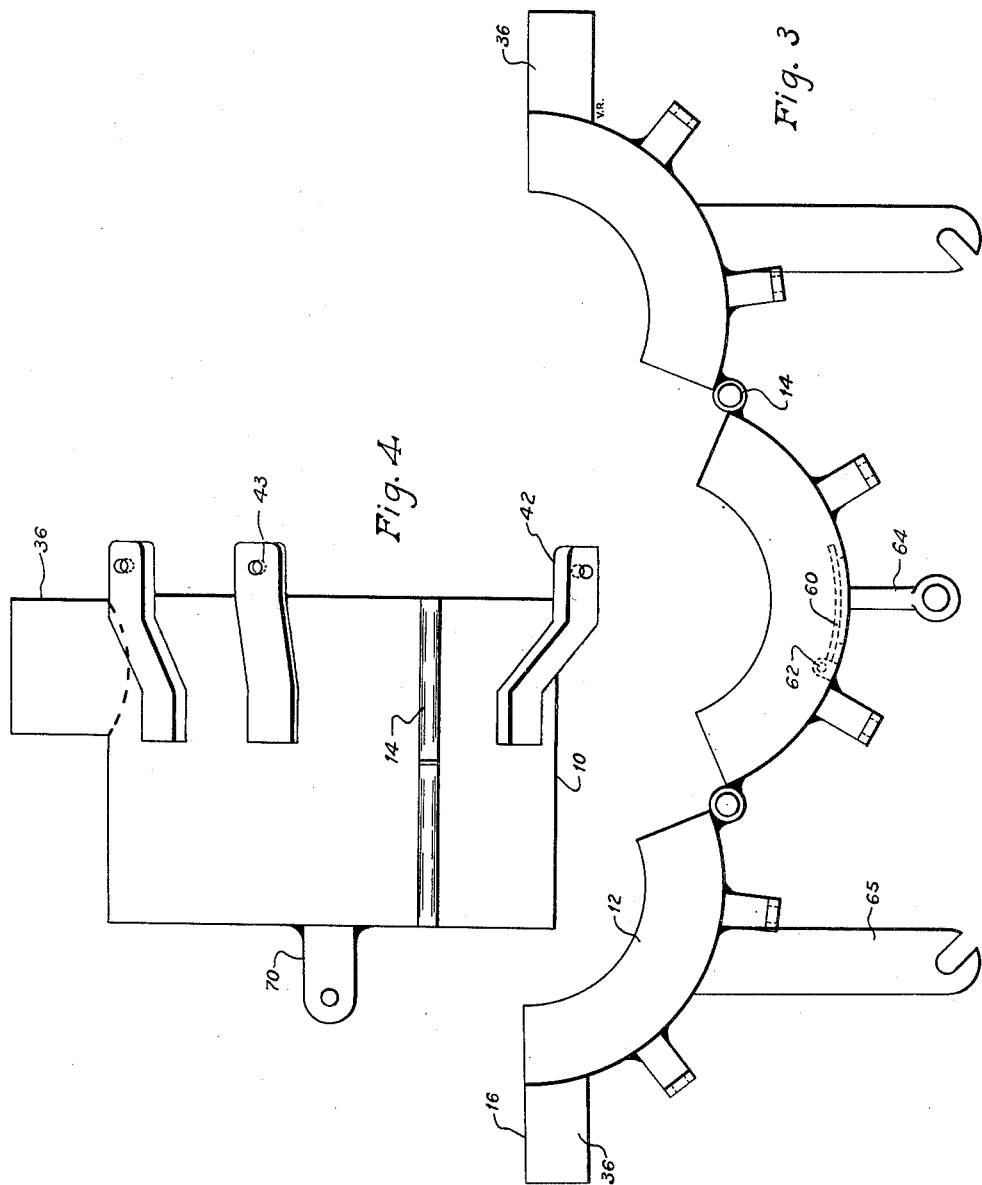

Patented Mar. 20, 1951

2,545,792

UNITED STATES PATENT OFFICE 2,545,792

PIPE COATING SHOE

Lewis Perrault, Tulsa, Okla., assignor to Perrault Bros., Tulsa, Okla., a partnership Application March 11, 1946, Serial No. 653,640

6 Claims. (Cl. 91—30)

This invention relates to a coating shoe for coating cylindrical bodies such as pipe, tubing, and the like, with a protective coating of bituminous or asphalt material and the like.

Present day coating shoes for applying coating material to a pipe have necessarily utilized spacer members to provide a clearance between the inner periphery of the coating shoe and the outside diameter of the pipe in order to provide a desired thickness for the coating material. These spacer members are usually manually adjusted when a different clearance or adjustment is desired, especially when the coating shoe is utilized with a traveling coating machine traveling longitudinally along the pipe around curves, bends, variable inclines, and high spots such as welds in the pipe.

It is an important object of this invention to provide an apparatus adapted for use with a traveling coating machine for pipes and the like having a plurality of segmental independently adjustable plate members for adjusting the shoe and maintaining a universal thickness of coating material regardless of any variations in the contour of the pipe.

And still another object of this invention is to provide a coating shoe for pipe line traveling coating and wrapping machines which utilizes a counter-balance in order to balance the shoe on the pipe and keep it in proper alignment during the travel therealong.

And still another object of this invention is to provide a coating apparatus adapted for travel along a pipe which provides a plurality of guiding elements to prevent misalignment of the coating apparatus when passing over a projection or high spot in the pipe.

And an additional object of this invention is to provide a segmental annular coating shoe adapted for use with a traveling coating machine for pipes and the like which is flexibly mounted to the machine, whereupon the segmental sections will automatically spread apart upon contacting any protuberance in the pipe and facilitate passage thereover.

Other objects and advantages of the invention will be evident from the following detailed description, read in conjunction with the accompanying drawings, which illustrate my invention.

Figure 1:
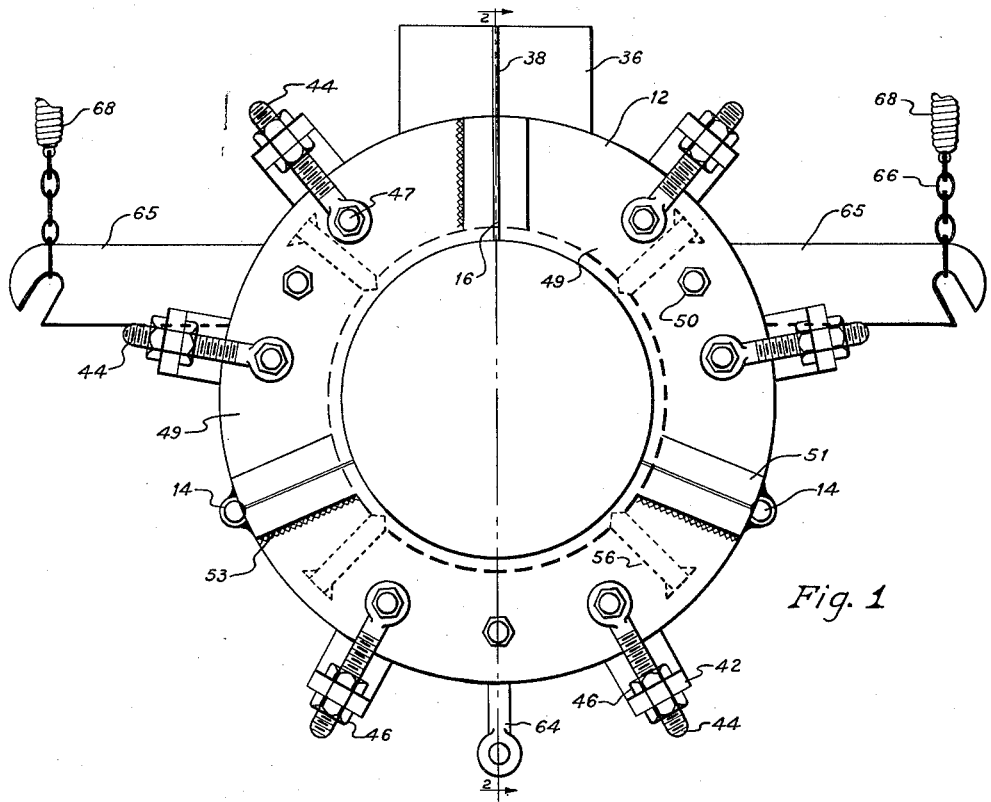
Figure 2:
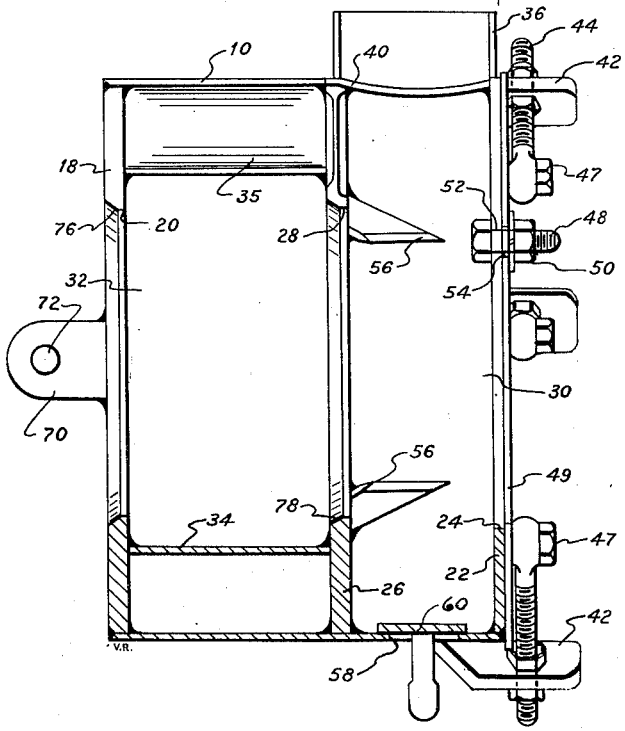

Figure 1 is an end elevational view of the improved coating shoe, with certain parts shown in dotted lines for clarity, Figure 2 is a sectional elevational view taken on lines 2—2 of Figure 1, Figure 3 is an end elevational view showing the coating shoe in open position, and with certain parts omitted, Figure 4 is a side elevational view with certain parts omitted for clarity.

Referring to the drawings in detail, and more particularly Figures 1 and 2, the coating shoe 10 comprises a plurality of arcuately shaped segments 12 severed and hinged together at 14 to provide the segmental annular shoe 10. From Figure 1 it will be apparent that the hinged members 14 are provided in circumferentially spaced relation to each other. The sections are identical and are also severed at 16, but at this point are not provided with a hinged member for reasons as will be hereinafter set forth. The segmental shoe 10 is provided with a front plate 18 having an aperture 20, and similarly a back plate 22 having an aperture 24 forming a cylindrical body or housing adapted to encircle a pipe (not shown). The shoe 10 is provided with an intermediate partition or plate 26 extending outwardly from the inner periphery of the segmental cylinder 10, to provide an aperture 28 in substantially parallel alignment with the apertures 20 and 24. The construction of the segmental shoe with the partition 26 provides a reservoir chamber 30 and a counter-balancing chamber 32, as will be hereinafter set forth. A segmental annular ring 34 severed at 14 and 16 in conformance with segments 12 is disposed in chamber 32 and in spaced relation to the inner periphery of the cylinder 10. Each end of the ring segments is provided with a plate 34, thereby closing off part of the chamber 32 from the coating material and acting as a counter-balance for the front portion of the coating shoe to balance the shoe on the pipe and maintaining proper alignment as will be hereinafter set forth.

The uppermost portion of the cylinder 10 is provided with an upstanding hollow cylindrical projection 36 secured thereto in any conventional manner, such as welding or the like. The cylinder 36 is split or severed at 38 in alignment with the upper dividing line 16 between the segments 12. The upper segments 12 are apertured at 40, providing communication between the inlet spout 36 and the chamber 30 to permit the flow of the coating material thereto, as will be hereinafter set forth. The outer periphery of the shoe 10 forming the reservoir 30 is provided with a plurality of circumferentially spaced brackets 42 (Fig. 4) secured thereto by welding and the like, and extending or overhanging the rear end of the cylinder 10. Each of the brackets is provided with an aperture 43 for receiving a stud bolt 44 and adjusting nuts 46 for a purpose to be hereinafter set forth. A plurality of arcuately shaped plates 49 are secured to the back plate 22 of the cylinder 10 by studs 48 and nuts 50, with each stud 48 extending through apertures 52 and 54 in the plates 22 and 49 respectively. It will be apparent that a locking and guide bolt 48 is provided for each plate 49 secured to the plates 22 of each arcuate segment 12. Each of the studs 44 is preferably an eye bolt adapted to receive a bolt 47 connected with a plate 49. It will be apparent from Figure 2 that aperture 54 is of increased diameter and preferably elongated to allow for adjustment of the plates 49 with respect to the plate 22, and the outer diameter of the pipe to be coated (not shown) by means of a bolt 48 and nut 50 in conjunction with a stud 44 and nuts 46. This adjustment is accomplished by loosening of the nut 50 on stud 48, which in turn allows for movement of segmental plates 49 by means of the stud 48 after loosening of the nuts 46. It will be apparent that the plates 49 can be adjusted toward and away from the outer periphery of the pipe in an amount variable with the elongation of the aperture 54. The chamber 30 is provided with a plurality of guides or projections 56 protruding from the partition plate 26, and are preferably circumferentially spaced around the interior of the chamber 30 in a position slightly less than the inner periphery of the plate 49. These guides prevent any misalignment of the coating shoe when passing over a projection or high spot in the pipe, as will be hereinafter set forth. The lowermost portion of the chamber 30 is apertured at 58 and is provided with a valve 60 hinged at 62. The valve 60 is provided with an actuating rod 64 having a handle (not shown) allowing opening of the valve 60 for removal of any excess coating material when the shoe is not in use, thereby preventing the coating material from freezing in the reservoir 30.

A plurality of outwardly extending bracket arms 65 are provided on the outer periphery of the segmental shoe 10 and are adapted to be secured to a chain 66 which in turn is secured to a helical spring extending from the frame of the traveling coating machine (not shown) thereby flexibly mounting the coating shoe with respect to the pipe. The front plate 20 of the machine is provided with a pair of brackets 70 (only one of which is shown) having an aperture 72, and each providing a longitudinal connection for the coating shoe 10 with the frame of the coating and wrapping machine (not shown) thereby assuring that the coating shoe will be pulled along simultaneously with the forward travel of the machine.

It will be apparent from Figure 3 that the segmental shoe 10 can be disconnected from the brackets and opened at 16 and the hinges 14 to allow for placing and removal onto and from a pipe or the like. In operating position as shown in Figure 1 the segmental housing is maintained in closed position by the compression of the helical mounting springs 68. With each of the adjusting plates 49 set for a desired adjustment by respective adjusting studs 48 and 44, the coating material or dope (not shown) is discharged through the cylindrical inlet 36 and into the reservoir 30 and chamber 32. As the coating shoe is moved longitudinally along the pipe by the traveling machine (not shown) the segmental plates 49 determine the amount of thickness of coating material applied to the pipe according to their independent adjustment. It will be apparent as long as the pipe is more or less level that very little adjustment is necessary; however, when the contour of the pipe changes by going uphill or downhill curves and bends, it is necessary to vary the position of the plates 49 to maintain a universal thickness. From Figure 1 it will be apparent that with the machine traveling uphill, for example, the upper portion of shoe 10 and plates 49 will approach the outer periphery of the pipe 10 while the lower portion of the shoe plates will move away from the pipe. With the independent adjustment of the segmental plates 49, the variable clearance of this uphill travel is taken care of by the adjustment of the plates relative to the aperture 54. In similar manner, downhill travel of the machine or curves or bends in the pipe are taken care of by the individual adjustment of the numerous segments of the coating shoe.

The chambers 32 and 35 act as a counterbalancing section to keep the shoe in alignment during the travel along the pipe. The close fit of the aperture 28 with the pipe prevents any substantial amount of the coating material entering the chamber 32. This is assisted by the forward travel of the shoe moving away from the flow of the coating material at all times.

It will be apparent from Figure 2 that the front face of plate 18 adjacent to the aperture 29 is chamfered at 76. Similarly, the partition plate 28 is chamfered at 78 so that when the counterbalance section 32 of the shoe contacts a high spot in the pipe such as a weld or the like, it will enable the shoe to ride over the high spot, and the hinged segments 12 are automatically spread apart due to the flexible mounting, thereby facilitating easy passage of the shoe over irregularities or projections in the pipe.

From the foregoing it will be apparent that the number of arcuately shaped segments 12 and adjusting plates 49 can be varied in accordance with the size of the pipe to be coated. In the present instance, three arcuately shaped segments are shown, but not limited thereto, and any proportionate number may be utilized. The segmental annular coating shoe provides a unitary coating apparatus, which, due to its flexible mounting upon the helical springs and brackets, provides for an automatic opening of the segments upon encountering any high spot or protuberance in the pipe. Furthermore, the chamfered portions of the aperture 29 and partition plate 28 facilitate movement of the coating shoe over welded sections or protuberances. The circumferentially spaced guide members 56 prevent misalignment of the shoe during its longitudinal travel along the pipe. These guiding members are preferably slightly larger in diameter than the outside diameter of the pipe (not shown), and if the coating shoe has a tendency to distort itself or get out of alignment, the guide members 56 preclude the possibility. Furthermore, the precise and accurate positioning of the arcuate plates 49, always in spaced relation to the pipe by the individual adjusting studs 44 and 48 assure a constant and universal application of the coating material on to the outer periphery of the pipe, regardless of variations in the contour thereof.

At the point of each division between the segments 12 and on the outside of plates 49 is provided a cover plate 51 secured to a plate 49 at 53 by welding or the like. These cover plates prevent spilling of the coating material.

Changes may be made in the specifications and drawings without departing from the spirit of the invention within the scope of the following claims as set forth.

What I claim is:

1. A device for applying coating material to a pipe or the like and comprising an annular segmental housing having apertured end plates, a plurality of segmental arcuately-shaped flat plates disposed on the housing adjacent one end thereof in spaced relation to the pipe, means providing adjustment of the plates relative to the pipe, and means disposed within the housing to prevent misalignment thereof during travel along the pipe.

2. A coating shoe comprising a substantially annular segmental housing adapted to surround a pipe in spaced relation thereto and provided with a reservoir chamber and a counterbalancing chamber, a plurality of arcuately-shaped segmental flat annular plates disposed on one face of the reservoir chamber, means for securing the plates to the housing and providing variable positioning of the plates relative to the outer periphery of the pipe, a plurality of circumferentially spaced brackets disposed on the outer periphery of the reservoir, adjusting means secured to the brackets for adjusting the annular plates relative to the pipe, and means for flexibly anchoring the coating shoe to provide for spreading of the segmental housing upon contact with a projection in the pipe.

3. A coating shoe comprising a plurality of arcuately shaped hinged sections to provide an annular segmental housing, a partition plate within the housing to provide a reservoir chamber and a counter-balancing chamber, angularly disposed flanges in the reservoir chamber disposed in spaced relation to the pipe to prevent misalignment of the housing during travel along the pipe, and independently adjustable plate means cooperating with the housing and disposed in spaced relation to the pipe for varying the thickness of the coating material applied thereto.

4. A coating shoe comprising a plurality of curved sections hinged together to provide a segmental annular housing having apertured plates at the ends thereof, a partition plate within the housing providing a reservoir chamber and a counterbalancing chamber, inlet means for directing coating material into the reservoir, a plurality of curved plates disposed on the rearward end of the housing, means for securing each of the curved plates to the housing, an elongated aperture in each of the curved plates permitting movement of the plates relative to the outer periphery of the pipe, a plurality of circumferentially spaced brackets disposed on the outer periphery of the housing and overhanging the rearward end thereof, adjusting means carried by the brackets and connecting with the curved plates to provide for adjustment of the plates relative to the pipe, said forward end plate of the housing being chamfered to guide the coating shoe over projections of the pipe, and guide means disposed within the housing to prevent misalignment of the shoe during travel along the pipe.

5. A coating shoe comprising a plurality of hinged sections to provide a segmental substantially annular housing, a plurality of plates disposed on one end of the housing, means for securing each of the plates to the housing, an elongated aperture in each of the plates permitting movement of the plates relative to the outer periphery of the pipe, a plurality of circumferentially spaced brackets disposed on the outer periphery of the housing and overhanging the rearward end thereof, adjusting means secured to the brackets and connected with the plates to provide adjustment of the plates toward and away from the outer periphery of the pipe.

6. A coating shoe comprising a substantially annular segmental housing having apertured end plates adapted to surround a pipe in spaced relation thereto, a partition in the housing to provide a reservoir chamber and a counterbalancing chamber, a plurality of arcuately-shaped segmental flat plates disposed adjacent one end face of the housing, means for securing the plates to the housing, and elongated slot means cooperating with the securing means to provide variable positioning of the plates to the outer periphery of the pipe, a plurality of circumferentially spaced brackets disposed on the reservoir, adjusting means secured to the brackets and to the segmental plates, and means to provide for adjustment of the adjusting means relative to the brackets to provide for adjustment of the plates relative to the pipe.

LEWIS PERRAULT.

REFERENCES CITED

The following references are of record in the file of this patent:

UNITED STATES PATENTS

| Number | Name | Date |
| --- | --- | --- |
| 1,049,170 | Thomas | Dec. 31, 1912 |
| 1,727,929 | Berssenbrugge | Sept. 10, 1929 |
| 1,867,476 | Rogers | July 12, 1932 |
| 2,305,005 | Henry | Dec. 15, 1942 |
| 2,370,314 | Jenner | Feb. 27, 1945 |